United States Patent Office 3,409,639
Patented Nov. 5, 1968

3,409,639
WATER INSOLUBLE DYESTUFFS AND DYESTUFF PRECURSORS
Elmore L. Bement, Buffalo, and Frederick C. Boye, Orchard Park, N.Y., assignors to Allied Chemical Corporation, New York, N.Y., a corporation of New York
No Drawing. Filed Sept. 2, 1965, Ser. No. 484,733
4 Claims. (Cl. 260—397.7)

ABSTRACT OF THE DISCLOSURE

Production of 4-arylamino-3-nitrobenzene sulfonamide dyestuffs by reaction of a 4-halo-3-nitro-benzene sulfonamide with an aryl amine. The 4-halo-3-nitrobenzene sulfonamides are prepared by reacting an N-(hydroxyalkyl)-4-halo-3-nitrobenzene sulfonamide with an organic isocyanate. The 4-arylamino-3-nitrobenzene sulfonamide dyestuffs of the invention impart yellow colorations to synthetic polyester fibers which are fast to light, washing, and sublimation.

---

The present invention relates to novel water insoluble dyestuffs and precursors thereof and more particularly to new yellow dyes for synthetic polyester fiber which are fast to light, washing, and sublimation. It is especially concerned with new 4-arylamino-3-nitrobenzene sulfonamide dyestuffs and precursors thereof.

Synthetic polyester materials such as polyethylene terephthalate ("Dacron"), poly-(1,4-cyclohexylene) terephthalate ("Kodel") and similar poly-alkylene esters of aromatic dicarboxylic acids are of great importance to the textile industry because of their excellent properties, notably strength, crease resistance, and washability.

It is known to dye synthetic polyester fibers and fabrics with various water insoluble dyestuffs of the 4-aryl-amino-3-nitrobenzene sulfonamide series, for example N-hydroxyalkyl-4-arylamino-3-nitrobenzene sulfonamides [J. P. Niederhauser Teintex, 25 No. 2, 79 (1960); V. S. Salvin et al. Am. Dyest. Reptr. 48 43 (1959)], but relatively few of the proposed structures possess in combination the advantageous properties of good affinity for the polyester, attractive shade, and fastness to light and washing. Moreover, the N-hydroxyalkyl sulfonamides mentioned above are relatively fugitive to sublimation, for example when heated to 200° C.

It is an object of the present invention to devise new dyestuffs of the 4-arylamino-3-nitrobenzene sulfonamide series and precursors thereof.

It is another object of the invention to prepare novel 4-arylamino-3-nitrosulfonamide dyes which have excellent affinity for synthetic polyester fiber and dye it in attractive yellow shades of excellent fastness to light, washing, and sublimation.

These and other objects and advantages will be apparent from the following description of our invention.

We have discovered a new class of 4-arylamino-3-nitro-benzene sulfonamide dyes, which dye synthetic polyester fiber, attractive yellow shades of excellent fastness to light, washing, and sublimation, and which are represented by the general formula

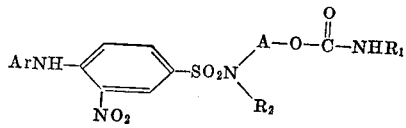

wherein Ar is an aryl radical of the benzene or naphthalene series. Preferably Ar is an aryl radical of the benzene series. A is an alkylene radical of 2 to 4 carbon atoms inclusive. Preferably A is the ethylene radical. $R_1$ is a lower alkyl radical of 1 to 4 carbon atoms inclusive, a cycloalkyl radical or an aralkyl, or aryl radical of the benzene series. Preferably $R_1$ is an aryl radical of the benzene series. $R_2$ is hydrogen, a lower alkyl radical, a lower cyanoalkyl radical, a lower fluoroalkyl radical, a lower alkoxy alkyl radical, a lower hydroxyalkyl radical or the radical

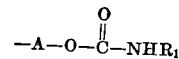

wherein A and $R_1$ have the meanings given above. Preferably $R_2$ is lower alkyl. The invention also contemplates novel 4-halo-3-nitrobenzene sulfonamides of the formula

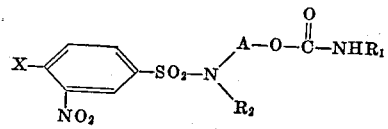

wherein A, $R_1$ and $R_2$ have the meanings given above and X is bromine or chlorine, from which the above dyestuffs are prepared by reaction with an aryl amine.

The new dye precursors can be prepared by the reaction of an organic isocyanate and an N-(hydroxyalkyl)-4-halo-3-nitrobenzene sulfonamide in an inert solvent or diluent, e.g. benzene or toluene. Representative organic isocyanates which can be utilized in synthesizing the dyestuff intermediates of the invention include: methyl isocyanate, propyl isocyanate, phenyl isocyanate, benzyl isocyanate, p-toluene isocyanate, cyclohexyl isocyanate, with phenyl isocyanate being the preferred isocyanate.

The N-hydroxyalkyl-4-halo-3-nitrobenzene sulfonamides employed as starting materials in the preparation of our novel dyes and dye precursors are known compounds such as described in U.S. Patent 2,460,010 which are readily prepared by reaction of 4-halo-3-nitrobenzene sulfonyl chloride and an ω-amino-lower alkanol. Representative examples of these N-hydroxylalkyl sulfonamides include:

N-ethyl, N-(2-hydroxyethyl)-4-chloro-3-nitrobenzene sulfonamide
N,N-bis(2-hydroxypropyl)-4-chloro-3-nitrobenzene sulfonamide
N,N-bis-(2-hydroxyethyl)-4-chloro-3-nitrobenzene sulfonamide
N-(2-cyanopropyl)-N-(2-hydroxyethyl)-4-chloro-3-nitrobenzene sulfonamide
N-(2,2,2-trifluoroethyl)-N-(2-hydroxyethyl)-4-chloro-3-nitrobenzene sulfonamide
N-methyl-N-(4-hydroxybutyl)-4-chloro-3-nitrobenzene sulfonamide
N-(2-hydroxyethyl)-4-chloro-3-nitrobenzene sulfonamide
N-ethyl-N-(2-hydroxyethyl)-4-bromo-3-nitrobenzene sulfonamide
N-(2-methoxyethyl)-N-(2-hydroxyethyl)-4-chloro-3-nitrobenzene sulfonamide Preferably, an N-hydroxyalkyl-3-nitrobenzene sulfonamide containing a 4-chloro-substituent is employed as starting material.

The condensation of the N-hydroxyalkyl-4-halo-3-nitrobenzene sulfonamide with the organic isocyanate is carried out by reaction of the sulfonamide with at least about one molar proportion of isocyanate per mole of sulfonamide. Preferably a molar excess of about 2 to 10 percent and especially about 5 percent of organic isocyanate is used. The condensation is effected by heating the reactants at about 60 to 140° C. preferably at about 75 to 120° C. Since organic isocyanates are highly sensitive to water, the condensation is carried out under substantially anhydrous conditions, for example the sulfonamide starting material charged should be dry. Advantageously a water-immiscible solvent, e.g. benzene, toluene is employed as a reaction diluent. The dyestuff precursor is isolated in conventional fashion, e.g. by filtration of a benzene slurry of the reaction mass.

The new dyestuffs of the present invention are prepared by the condensation of the dye precursors prepared in the aforementioned fashion with an aryl amine. The chemistry involved in this reaction is very simple—an aryl amine and the new precursors containing an active halogen are condensed in water in the presence of an acid-binding agent such as sodium carbonate, calcium carbonate, sodium acetate and magnesium oxide. The mixture is refluxed with agitation until completion of the reaction. The upper aqueous layer of the resulting mixture is separated and the lower organic layer is solidified. The resulting solid is pulverized in water, recovered, washed, and dried to obtain the desired product.

Representative aryl amines which can be employed in conjunction with the new precursors of this invention in the above-described condensation reaction to obtain the new dyestuffs of this invention include aniline, p-toluidine, m-anisidine, p-phenylaniline, o-toluidine, p-henetidine, σ-naphthylamine, β-naphthylamine, cresidine, ρ-aminoacetophenone and p-amino acetanilide. The preferred aryl amine is aniline.

The new dyes of the invention are difficulty soluble in water and are applied from aqueous dispersions to synthetic polyester fiber by any of the well-known procedures employed for dyeing such fibers with disperse dyestuffs, particularly by the "Thermosol Method of Dyeing," American Dyestuff Reporter 42 1 (1953). The novel dyes can be prepared for use as disperse dyes by admixture with suitable dispersing agents, such as a formaldehyde-naphthalene β-sulfonic acid condensation product or a sodium salt of lignin sulfonic acid, grinding the mixture in the presence of water, drying the dispersed mixture and grinding the dried product to a powder.

The novel dyes of the invention have excellent affinity for synthetic polyester fiber such as polyethylene terephthalate ("Dacron"), and poly-(1,4-cyclohexylene) terephthalate ("Kodel"), and dye it in attractive bright yellow shades fast to light, washing, and particularly to sublimation. The new dyestuffs do not sublime appreciably on being heated to temperatures above about 200° C.

In addition, the present novel dyestuffs, when dispersed in water, dye fibers of cellulose acetate, cellulose triacetate ("Arnel"), polyacrylonitrile ("Creslan"), and vinyl chloride-acrylonitrile copolymer ("Dynel") in excellent yellow shades.

In the following examples which serve to illustrate our invention parts and percentages are by weight unless otherwise noted and temperatures are in degrees centigrade.

Example I

Part A.—Over a period of 15 minutes 52 parts (0.435 mole) of phenyl isocyanate is charged to an agitated solution of 128 parts (0.415 mole) of N-ethyl, N-(2-hydroxyethyl)-4-chloro-3-nitrobenzene sulfonamide in 210 parts of benzene. The resulting mixture is refluxed for two hours, cooled to ambient temperature and evaporated to dryness at ambient temperature over a period of about 48 hours. The solid residue is slurried in 132 parts of benzene and filtered. The solid which is collected is washed successively with 88 parts of benzene and 133.5 parts of ligroin petroleum fraction and dried under vacuum at 60°. There is thus obtained 124 parts (70% of theory) of 2-(4-chloro-N - ethyl - 3 - nitrophenylsulfonamido)ethyl carbanilate (M.P. 106–108°) corresponding to the structural formula:

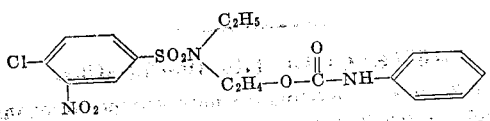

Part B.—A mixture of 7 parts (0.0164 mole) of 2-(4-chloro - N - ethyl-3-nitrophenylsulfonamido)ethyl carbanilate, 5 parts (0.054 mole) of aniline, 2 parts of sodium carbonate and 100 parts of water is refluxed with agitation for 24 hours and cooled to ambient temperature. The upper aqueous layer of the resulting mixture is separated and the lower organic layer is allowed to stand for 16 hours at ambient temperature. The resulting solid mass is pulverized under water, recovered by filtration, washed with water and dried under vacuum at ambient temperature for 48 hours. There is thus obtained 8.8 parts of 2-(4-anilino-N-ethyl-3-nitrophenylsulfonamide) ethyl carbanilate corresponding to the structural formula:

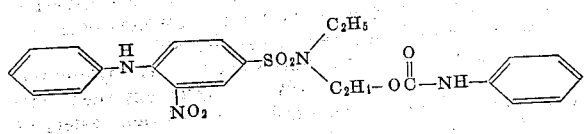

The product, after being ground with Marasperse N (sodium lignosulfonate, Marathon Division of American Can Co.), spray dried and dispersed in water, dyes "Dacron" polyethylene terephthalate fabric in a bright, attractive yellow shade characterized by excellent fastness to light, washing and sublimation. The dyeing obtained exhibits no appreciable sublimation on heating to 207°. Aqueous dispersions of the dye also dye cellulose acetate, "Arnel," "Creslan" and "Dynel" in fast, attractive yellow shades.

Examples II–IV

In the following examples set forth in Table I the procedure of Example I is repeated in preparing the dye precursors and dyestuffs listed in columns C and E respectively. Columns A, B and D list respectively the N-hydroxyalkyl - 4 - halo - 3 - nitrobenzene sulfonamide, organic isocyanate and the aryl amine employed in each example. The dyestuffs of these examples when dispersed in water dye polyethylene terephthalate in fast, attractive yellow shades.

TABLE I

| Example | A<br>N-hydroxyalkyl-4-halo-3-nitrobenzene sulfonamide | B<br>Organic Isocyanate | C<br>Precursor |
|---|---|---|---|
| II | Same as Example I | Same as Example I | Same as Example I. |
| III* | Cl—⟨⟩(NO₂)—SO₂N(C₂H₄OH)(C₂H₄OH) | ----do---- | Cl—⟨⟩(NO₂)—SO₂N[C₂H₄OC(O)—NH—⟨⟩]₂ |
| IV | Same as Example I | ----do---- | Same as Example I. |

See footnote at end of table.

TABLE I—Continued

| Example | D Aryl Amine | E Dyestuff |
|---|---|---|
| II | 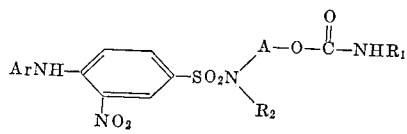 | 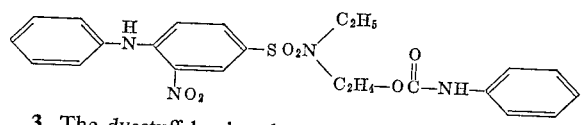 |
| III | Same as Example I | 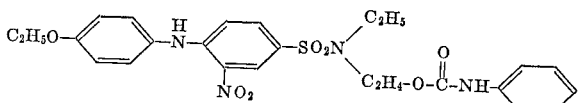 |
| IV | 4-phenylaniline | 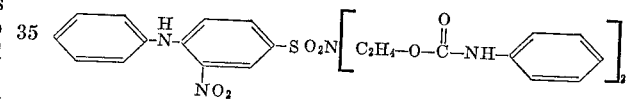 |

*Two molar proportions of phenyl isocyanate are employed based on the N-hydroxyalkyl sulfonamide.

We claim:

1. A compound of the formula

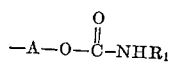

wherein Ar represents a member selected from the group consisting of naphthyl, biphenylyl, phenyl and lower alkyl-, lower alkoxy-, lower alkanoyl-, and lower alkyl carboxamido-substituted derivatives thereof, said lower alkyl-, lower alkoxy-, lower alkanoyl- and lower alkyl carboxamido groups containing 1 or 2 carbon atoms, A represents an alkylene radical of 2 to 4 carbon atoms inclusive, $R_1$ represents a member selected from the group consisting of lower alkyl-, cyclohexyl, phenyl-substituted lower alkyl, phenyl, and lower alkyl-substituted phenyl, said lower alkyl groups of said phenyl-substituted lower alkyl and lower alkyl-substituted phenyl groups containing 1 or 2 carbon atoms, and $R_2$ is selected from the group consisting of hydrogen, lower alkyl, lower fluoroalkyl, lower cyanoalkyl, lower alkoxyalkyl, lower hydroxyalkyl and $$-A-O-\overset{O}{\underset{\|}{C}}-NHR_1$$

wherein A and $R_1$ have the meaning given above.

2. The dyestuff having the following formula

3. The dyestuff having the following formula

4. The dyestuff having the following formula

References Cited

UNITED STATES PATENTS 2,921,945  1/1960  Adams et al. _____ 260—397.7

JOHN D. RANDOLPH, *Primary Examiner.*

H. I. MOATZ, *Assistant Examiner.*